(12) United States Patent
Honma et al.

(10) Patent No.: US 6,374,572 B1
(45) Date of Patent: Apr. 23, 2002

(54) FILLING/PACKING MACHINE

(75) Inventors: Katsumi Honma; Yasuhito Miyazawa, both of Nagaoka (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 09/530,109

(22) PCT Filed: Aug. 25, 1999

(86) PCT No.: PCT/JP99/04598

§ 371 Date: Apr. 25, 2000

§ 102(e) Date: Apr. 25, 2000

(87) PCT Pub. No.: WO00/12384

PCT Pub. Date: Mar. 9, 2000

(30) Foreign Application Priority Data

Aug. 31, 1998 (JP) .......................................... 10-246355

(51) Int. Cl.[7] .............................................. B65B 57/02
(52) U.S. Cl. ................................................. 53/55; 53/64
(58) Field of Search ................................ 53/55, 52, 64, 53/551

(56) References Cited

U.S. PATENT DOCUMENTS

| 5,241,800 A | * | 9/1993 | Steinke et al. ................ 53/55 |
| 5,822,949 A | * | 10/1998 | Naoi .............................. 53/55 |
| 6,173,551 B1 | * | 1/2001 | Bowman, Jr et al. ....... 53/131.4 |

FOREIGN PATENT DOCUMENTS

| JP | 50-20983 | 6/1975 |
| JP | 55-97305 | 7/1980 |
| JP | 8-133211 | 5/1996 |
| JP | 8-151005 | 6/1996 |
| JP | 9-272511 | 10/1997 |

\* cited by examiner

*Primary Examiner*—Rinaldi I. Rada
*Assistant Examiner*—John Paradiso
(74) *Attorney, Agent, or Firm*—McDermott, Will & Emery

(57) ABSTRACT

A filling and packaging machine adapted to vertically seal a film which is continuously fed, by a vertical sealing unit and thereby form the film into a bottomed cylindrical body, laterally seal the cylindrical film by a lateral sealing unit and thereby form a bottom portion of a packaging bag to be obtained, pack an object material into the bottomed cylindrical film from a filling nozzle disposed in the film, and laterally seal while feeding the film the portion of the film which is to form a mouth of the packaging bag by the lateral sealing unit, whereby the material is packaged continuously, the machine including a material supply unit joined to the filling nozzle and adapted to supply the object material, a detector adapted to detect the lateral sealing time of the lateral sealing unit, and a control unit for having the material supplied intermittently by starting a material supplying operation of the material supply unit when a predetermined period of time has elapsed after a lateral sealing signal is outputted from the lateral sealing time detector, continuing the supplying of the material for a predetermined period of time and then stopping supplying the material. The material supplied intermittently is packaged continuously without being held between the laterally sealed portions of the packaging bag.

5 Claims, 4 Drawing Sheets

FILLING/PACKING MACHINE

BACKGROUND OF THE INVENTION

1. Field of the Invention

This invention relates to a filling and packaging machine adapted to make packaging bags from a rolled film and fill the bags with a material.

2. Description of the Related Art

There are known filling and packaging machines as disclosed, for example, in Japanese Patent Laid-Open Nos. 153410/1989, 4626/1990 and 32929/1990, which are adapted to fold in two a film which is continuously fed, superpose edge portions of the folded film on each other and vertically seal the superposed edge portions by a vertical sealing unit, supply a material into the vertically sealed and cylindrically formed film, and package the material by laterally sealing the resultant film by a lateral sealing unit.

In a filling and packaging machine adapted to fill a packaging bag with a liquid as an object material, the material is supplied continuously by operating in general a material supply pump continuously with a vertically sealed and cylindrically formed film also supplied continuously, and the material packed in the film is packaged continuously by sealing the film by a lateral sealing unit. In this machine, the cylindrical film is supplied with the film held between lateral sealing rolls, which are arranged in an opposed state, of the lateral sealing unit. Therefore, even when the liquid, the material to be packed in the film exists between the lateral sealing rolls, it is squeezed out vertically by the lateral sealing rolls, and the film is thermally sealed, whereby the lateral sealing of the film is done.

However, when the liquid, a material to be packed in the film is formed of a highly viscous material of a fluidity or a solid-containing material of a fluidity, the squeezing mentioned above of the material is not done excellently in some cases. Consequently, the material not squeezed out from but residing in the laterally sealed portion is held between the sealed edge sections of the film to cause imperfect sealing of the film to occur. Therefore, such a material could not be applied as it is to the filling and packaging machine.

In order to package such a material, it is necessary to use a filling and packaging machine of the type which is operated by stopping a film, forming a bottom portion of the film by laterally sealing the film, stopping supplying the material after the material has been supplied in a predetermined quantity, feeding the film again and stop the same, and then packaging the material by laterally sealing the portion of the film which is to form a mouth of a packaging bag. In this machine, a n intermittent film transfer system by which the feeding and stopping of the film are done repeatedly is employed, so that a production rate cannot be increased in fact.

SUMMARY OF THE INVENTION

The present invention has been made in view of these circumstances, and provides a filling and packaging machine capable of packaging an object material at a high speed without causing a part of the material to be held between the laterally sealed edge sections of a film even when the material is formed of a highly viscous material of a fluidity or a solid-containing material of a fluidity, by feeding the film continuously with the material supplied intermittently.

According to an aspect of the present invention, the filling and packaging machine is adapted to vertically seal a film which is continuously fed, by a vertical sealing unit and thereby form the film into a bottomed cylindrical body, laterally seal the cylindrical film by a lateral sealing unit and thereby form a bottom portion of a packaging bag to be obtained, pack an object material into the bottomed cylindrical film from a filling nozzle disposed in the film, and laterally seal while feeding the film the portion of the film which is to form a mouth of the packaging bag by the lateral sealing unit, whereby the material is packaged continuously, the machine including a material supply unit joined to the filling nozzle and adapted to supply the object material, a detector adapted to detect the lateral sealing time of the lateral sealing unit, and a control unit for having the material supplied intermittently by starting a material supplying operation of the material supply unit when a predetermined period of time has elapsed after the generation of an output signal in the lateral sealing time detector, continuing the supplying of the material for a predetermined period of time and then stopping supplying the material. Owing to this arrangement, the material can be packaged at a high speed without causing a part of the material to be held between the sealed edge portions of the film, by intermittently supplying the material with the film fed continuously.

According to another aspect of the present invention, the filling and packaging machine is adapted to vertically seal a film which is continuously fed, by a vertical sealing unit and thereby form the film into a bottomed cylindrical body, laterally seal the cylindrical film by a lateral sealing unit and thereby form a bottom portion of a packaging bag to be obtained, pack an object material formed of a highly viscous material of a fluidity or a solid-containing material of a fluidity into the bottomed film from a filling nozzle disposed in the film, and laterally seal while feeding the film the portion of the film which is to form a mouth of the packaging bag by the lateral sealing unit, whereby the material is packaged continuously, the machine including a material supply unit joined to the filling nozzle and adapted to supply the object material, a detector adapted to detect the lateral sealing time of the lateral sealing unit, and a control unit for having the material supplied intermittently by controlling the material supply unit on the basis of the material supplying starting time between the time of the reception of an output signal from the lateral sealing time detector and that of starting supplying the material, and the material supplying continuation time between the time of starting supplying the material and that of stopping supplying the material.

Accordingly, in the present invention, the timing of the starting of the material supplying operation by the material supply unit and the time between the time of starting of the material supplying operation and that of the stopping thereof, i.e. the material supplying continuation time are set on the basis of an output signal from the lateral sealing time detector.

Namely, this filling and packaging machine is formed so that the supplying of the material is stopped when the film continuously fed is subjected to a lateral sealing operation of the lateral sealing units, with the material supplied when a predetermined period of time has elapsed after the completion of the lateral sealing operation, and so that the supplying of the material can be stopped by the time a subsequent lateral sealing operation has been started, by setting the time during which the supplying of the material is done, i.e. the material supplying continuation time. Therefore, the material can be packaged at a high speed without causing a part of the material to be held between the laterally sealed edge sections of the film.

This filling and packaging machine is provided with a material supplying condition setting unit for setting at least one of the material supplying starting time and material supplying continuation time on the basis of the packaging conditions for each kind of packaging bag, i.e., a material supplying condition setting unit for inputting the material supplying starting time and material supplying continuation time on the basis of the packaging conditions for each kind of packaging bag, i.e. the packaging conditions which include a film feeding speed, intervals at which packaging bags are formed and an amount of material to be packed in a cylindrical film by the material supplying unit, and which differ depending upon the kind of the packaging bag. Therefore, the supplying of the material by the material supply unit is controlled on the basis of the set values or the material supplying starting time and material supplying continuation time calculated on the basis of the set values.

This filling and packaging machine is also provided with a storage unit for storing the conditions set by this material supplying condition setting unit, so that it is possible to set the material supplying starting and stopping timing of the material supply unit in accordance with the packaging conditions which differ depending upon the kind of the packaging bag in which the material is to be packaged, and then store such data in the storage unit; readout as necessary the material supplying starting time and material supplying continuation time stored in the storage unit and matching each of the packaging conditions; and thereby automatically set the material supplying starting and stopping timing of the material supply unit.

The lateral sealing unit is formed of a pair of sealing plate-carrying lateral sealing rolls, while the lateral sealing time detector is formed of portions to be detected which are adapted to be rotated with the lateral sealing rolls, and which are provided correspondingly to the positions in which the seal plates are provided, and a detecting member for detecting the portions to be detected, the object material being supplied intermittently via a control unit on the basis of a signal from the detecting member.

BRIEF DESCRIPTION OF THE DRAWINGS

A preferred embodiment of the present invention will be described in detail on the basis of the following figures, wherein.

DESCRIPTION OF THE PREFERRED EMBODIMENT

Figure 1:
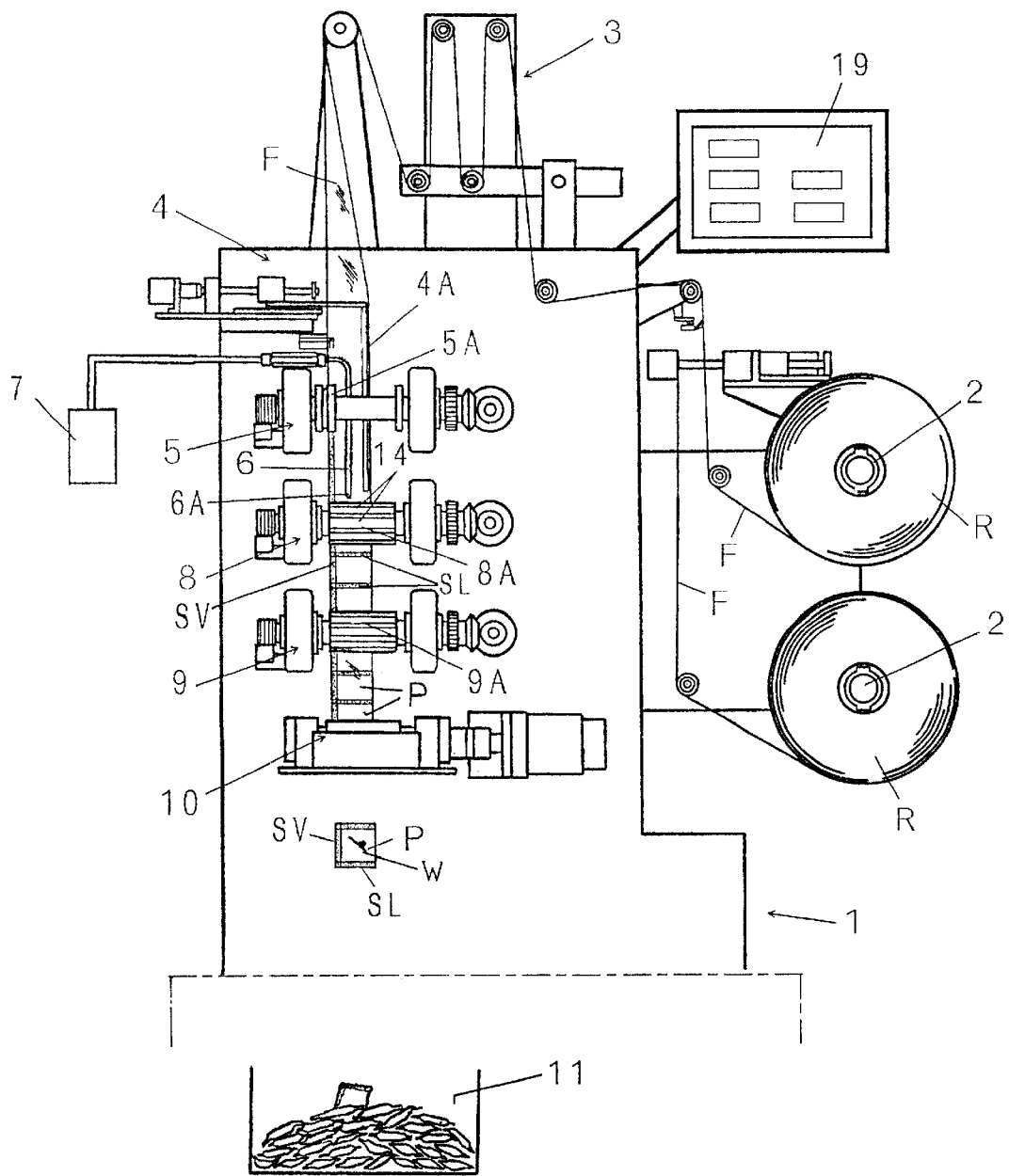
FIG. 1 is a front view of a filling and packaging machine showing an embodiment of the present invention.

An embodiment of the present invention will now be described on the basis of the attached drawings. FIG. 1 shows a general filling and packaging machine to which the present invention is applied, in which support members 2 on and from which film rolls R, i.e. circularly wound films can be mounted and removed for the replacement thereof are provided on one side of a machine base 1 of the filling and packaging machine, a film F being drawn out from a film roll R supported on a support member 2, and guided to a subsequent stage.

The machine base 1 is provided on an upper portion thereof with a film guide unit 3 formed of a slackening-of- film preventing mechanism and adapted to introduce a film F which has passed through the film guide unit 3 to a film folding unit 4, by a guide rod 4A of which the film is folded in two vertically.

In a position a little below the film folding unit 4, a vertical sealing unit 5 formed of a pair of vertical sealing rolls 5A is provided, and opened edge portions (opposite to a folded portion) of the film are superposed on each other by the vertical sealing unit 5, the superposed edge portions being then vertically sealed SV to form the film F to a cylindrical shape.

A filling nozzle 6 is provided between the guide rod 4A of the film folding unit 4 and the vertical sealing rolls 5A of the vertical sealing unit 5. This filling nozzle 6 is positioned in the interior of the cylindrically formed film F, via which a material W formed of a highly viscous material of a fluidity or a solid-containing material of a fluidity (for example, grain-containing mustard, jam, clay, etc.) can be packed in the film.

This filling nozzle 6 is joined to an object material supply unit 7 the material supplying and stopping operations of which are controlled by a control unit which will be described later. The filling nozzle 6 is provided so that the material W can be supplied to the interior of the cylindrical film F, and has a projecting outlet 6A in a closest possible position with respect to a first lateral sealing unit which will be described later.

Below the filling nozzle 6, first and second sealing units 8, 9 and a cutter 10 are provided.

The first lateral sealing unit 8 is adapted to heat seal the cylindrically formed film F by a pair of lateral sealing rolls 8A and thereby form lateral seals SL, whereby a bottom portion of a packaging bag P thus obtained is formed. After the packing of the material W by the filling nozzle 6 into the interior of this bottomed cylindrical film F finishes, the material W is packaged continuously by laterally sealing SL the portion of the film F which is to form a mouth portion of a packaging bag, by the lateral sealing unit 8 with the film F further fed. The part referred to above and laterally sealed SL of the film which is on the side of the mouth portion is the part which forms a bottom portion of a subsequent packaging bag P, the packaging of the material W being done successively.

The second lateral sealing unit 9 is formed of a structure substantially identical with that of the first lateral sealing unit 8. The sealing unit 9 is generally formed of a pair of non-heater-containing lateral sealing rolls 9A, which hold therebetween and press again by the lateral sealing rolls 9A the laterally sealed portion SL formed by the first lateral sealing unit 8, and thereby improve the adhesion of the film F or finally shape an outer surface of the lateral seals SL.

The cutter 10 is formed so that packaging bags P produced by cutting the lateral seals SL, which are formed by the first and second lateral sealing units 8, 9, at substantially central portions thereof, can be sent out via a carry-out unit 11; or so that packaging bags P which are produced by laterally sealing SL the film by the lateral sealing units 8, 9 with the operation of the cutter stopped, and which are not thereafter subjected to cutting but which are left in a continuously connected belt-like condition, can be sent out via the carry-out unit 11.

According to the present invention, the filling and packaging machine is adapted to vertically seal SV a film F which is continuously fed, by a vertical sealing unit 5 and thereby form the film F into a bottomed cylindrical body, laterally seal SL the cylindrical film F by a lateral sealing unit 8 and thereby form a bottom portion of a packaging bag P to be obtained, pack an object material W into the bottomed cylindrical film F from a filling nozzle 6 disposed in the film F, and laterally seal SL while feeding the film F the portion of the film F which is to form a mouth of the packaging bag P, by the lateral sealing unit 8, whereby the material W is packaged continuously, the machine having technical characteristics, especially, in the controlling of the supplying of the material W, and including a material supply unit 7 joined to the filling nozzle 6 and adapted to supply the object material W, a detector 12 adapted to detect the lateral sealing time of the lateral sealing unit 8, and a control unit 13 for having the material W supplied intermittently by controlling the material supply unit 7 on the basis of material supplying starting time T1 which is between the time of reception of an output signal from the lateral sealing time detector 12 and that of starting the supplying of the material W, and material supply continuation time T2 which is between the time of starting the supplying of the material W and that of stopping the supplying of the material W.

Figure 2:
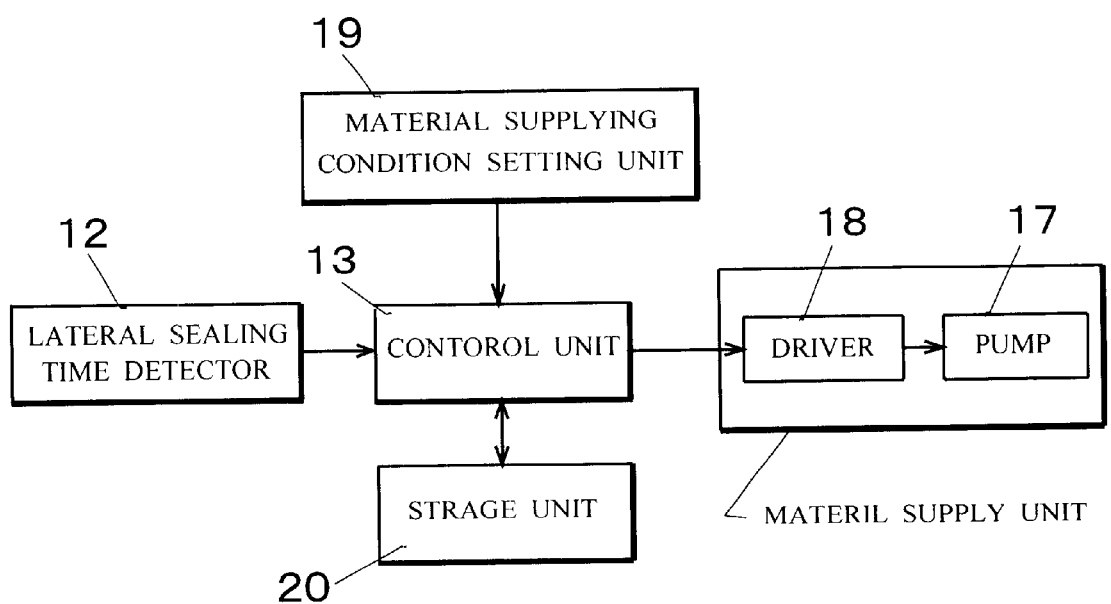
FIG. 2 is a block diagram of the filling and packaging machine showing the embodiment of the present invention.
Figure 3:
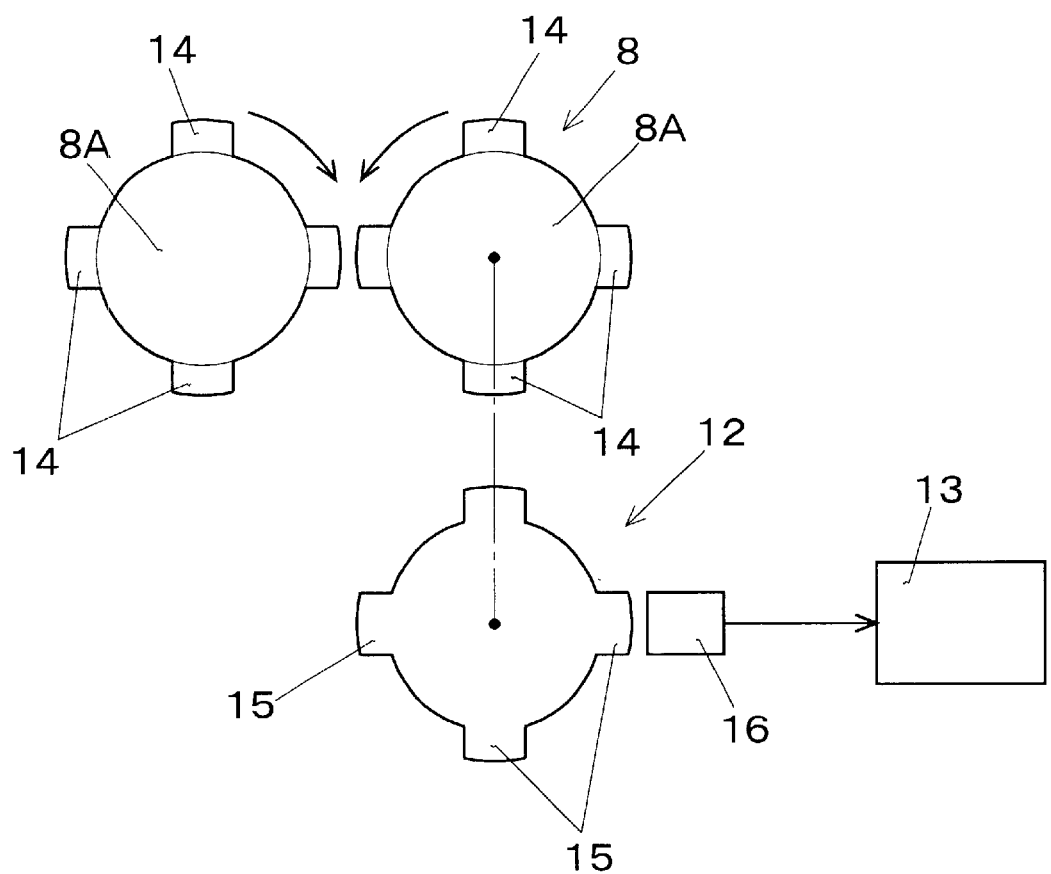
FIG. 3 illustrates a lateral sealing time detector in the embodiment of the present invention.

The filling and packaging machine according to the present invention will now be described with reference to a block diagram of FIG. 2, and FIG. 3.

The lateral sealing rolls 8A in the lateral seal unit 8 are provided with plural sealing plates 14 which the sealing plates are spaced from each other in the rotational direction thereof. The lateral sealing time detector 12 is provided coaxially with the lateral sealing rolls 8A, and adapted to be rotated therewith, and including plate type members to be detected 15 provided correspondingly to the portions of the lateral sealing rolls 8A which are provided with the sealing plates 14, and a detecting member 16 formed of a proximity sensor for detecting the members to be detected 15. A detected signal from the lateral sealing time detector 12 is sent to CPU, the control unit 13 to inform the CPU of the time at which the lateral sealing rolls 8A of the lateral sealing unit 8 work to laterally seal the film F.

The material supply unit 7 is formed of a pump 17, and a driver 18 for rotating a motor of the pump 17, and connected to the control unit 13. The material supply unit 7 is formed so that the material W can be supplied intermittently by carrying out the supplying of the material W with the motor of the pump 17 rotated forward, and stopping supplying the material W with the motor rotated reversely temporarily. According to this method, the supplying of a liquid material W the dripping of which is hard to be prevented is done advantageously, and the intermittent supplying of a material W can be done excellently by stopping supplying the same reliably.

A supplying condition setting unit 19 is formed of, for example, a touch panel into which numerical values based on the packaging conditions for each kind of material, i.e. the conditions including a film transfer speed, intervals at which the packaging bags P are formed, and the quantity of a material W supplied by the material supply unit 7 and packed in the film which differ depending upon the kinds of the object materials, or experientially determined numerical values are inputted directly, and these set values are sent to the control unit 13.

A storage unit 20 is adapted to store in a nonvolatile manner the set values inputted into the supplying condition setting unit 19, and also the supplying starting time T1 and the supplying continuation time T2 corresponding to the packaging conditions for each kind of material.

Figure 4:
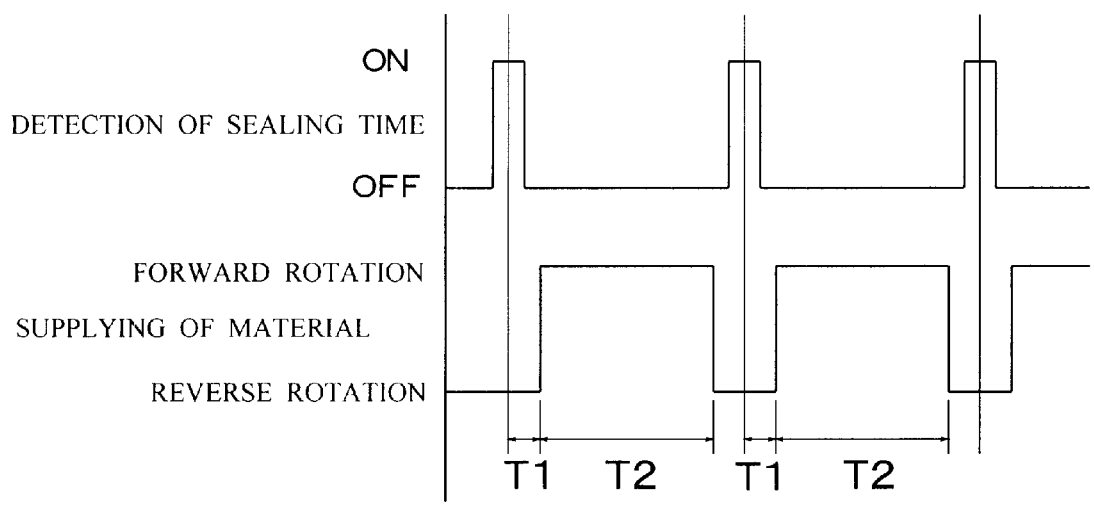
FIG. 4 is a time chart showing an operation of a material supply unit in the embodiment of the present invention.

Owing to this arrangement, when the lateral sealing time detector 12 provided in the lateral sealing unit 8 then detects the lateral sealing time, the supplying of the material W by the material supply unit 7 is controlled by the control unit 13 in accordance with an output signal from this lateral sealing time detector 12 on the basis of the supplying starting time T1 between the time of reception of the mentioned output signal and the time at which the supplying of the material W by the material supply unit 7 is started, and the supplying continuation time T2 between the time of starting of the supplying of the material M and that of the stopping thereof. (Refer to FIG. 4)

Namely, when a lateral sealing operation SL is carried out for the film F, which is transferred continuously, by the lateral sealing unit 8, the supplying of the material W is stopped, and, after a predetermined period of time during which a lateral sealing operation SL is carried out elapses (at the material supplying starting time T1), the supplying of the material W is carried out by forwardly rotating the motor of the pump 17. The time (the material supplying continuation time T2) during which the supplying of the material W is done is also set, whereby the motor of the pump 17 is rotated reversely after this material supplying continuation time T2 elapses, to enable the supplying of the material W to be stopped by the time a subsequent lateral sealing operation SL is started.

This enables the material W to be supplied intermittently with the film F transferred continuously, and the material W to be packaged at a high speed without causing the material W to be held between the laterally sealed portions SL.

The material supplying starting time T1 and the material supplying continuation time T2 are inputted by the material supplying condition setting unit 19 as numerical values based on the packaging conditions for each kind of material, i.e. the conditions including a film transfer speed, intervals at which the packaging bags P are formed, and the quantity of the material W supplied by the material supply unit 7, or experientially determined numerical values, the supplying of the material W by the material supply unit 7 being controlled in accordance with the material supplying starting time T1 and material supplying continuation time T2, which are set values based on these numerical values.

Since the conditions set by the material supplying condition setting unit 19 are stored by the kind of material in the storage unit 20, the timing of the starting and stopping of the material supply unit 7 can be set automatically by reading out as necessary from the storage unit 20 the supplying starting time T1 and supplying continuation time T2 which meet each packaging condition. When the kind of material is changed, the time mentioned above with respect to the packaging specifications used in the past can be set quickly.

In this case, concerning the kinds of materials which are used frequently, the data on the commercial name and number of materials to be packaged, and on the places where the packaged materials are delivered may be inputted together so that a setting operation can be carried out simply by accessing the supplying starting time T1 and supplying continuation time T2 with these data used as keys.

In this embodiment, both the supplying starting time T1 and supplying continuation time T2 are set in accordance with the packaging conditions for each kind of material, and stored in the storage unit 20. The filling and packaging machine may also be formed so that one of the supplying starting time T1 and supplying continuation time T2 is set as fixed time with the other as the time capable of being set in accordance with various kinds of packaging conditions.

Although the material supply unit 7 is formed so that the supplying of a material is controlled by forwardly/reversely rotating the motor of the pump 17, this unit 7 may also be formed so that the supplying of a material is controlled by simply turning on/off the motor of the pump 17.

The material supplying unit 7 is not limited to a material supplying unit in which the controlling of the supplying of a material is carried out by a pump rotating operation. It may also be formed so that the supplying of a material is done intermittently by opening and closing, for example, an electromagnetic valve employed.

Although the members to be detected 15 of the lateral sealing time detector 12 in this embodiment are formed of projecting plate type members, this members 15 may, conversely, be formed of recessed portions. These members 15 may have any shape as long as they are capable of being detected as to the lateral sealing time by the detecting member 16.

As described above, the present invention can provide a filling and packaging machine capable of packaging an object material at a high speed without causing the material to be held between laterally sealed portions even when the material to be packaged is formed of a highly viscous material of a fluidity or a solid-containing material of a fluidity, by supplying the material intermittently while transferring a film continuously.

What is claimed is:

1. A filling and packaging machine adapted to vertically seal a film which is continuously fed, by a vertical sealing unit and thereby form the film into a bottomed cylindrical body, laterally seal the cylindrical film by a lateral sealing unit and thereby form a bottom portion of a packaging bag to be obtained, pack an object material into the bottomed cylindrical film from a filling nozzle disposed in the film, and laterally seal while feeding the film the portion of the film which is to form a mouth of the packaging bag by the lateral sealing unit, whereby the material is packaged continuously, comprising a material supply unit joined to the filling nozzle and adapted to supply the object material, a detector adapted to detect the lateral sealing time of the lateral sealing unit, and a control unit for having the material supplied intermittently by starting a material supplying operation of the material supply unit when a predetermined period of time has elapsed from a time determined by the lateral sealing time detector, continuing the supplying of the material for a predetermined period of time and then stopping supplying the material.

2. A filling and packaging machine according to claim 1, wherein the lateral sealing unit is formed of a pair of sealing plate-carrying sealing rolls, the lateral sealing time detector being formed of members to be detected which are rotated with the sealing rolls and provided in positions corresponding to those in which the sealing plates are provided, and a detecting member for detecting the members to be detected.

3. A filling and packaging machine adapted to vertically seal a film which is continuously fed, by a vertical sealing unit and thereby for the film into a bottomed cylindrical body, laterally seal the cylindrical film by a lateral sealing unit and thereby form a bottom portion of a packaging bag to be obtained, pack an object material formed of a highly viscous material of a fluidity or a solid-containing material of a fluidity into the bottomed film from a filling nozzle disposed in the film, and laterally seal while feeding the film the portion of the film which is to form a mouth of the packaging bag by the lateral sealing unit, whereby the material is packaged continuously, comprising a material supply unit joined to the filling nozzle and adapted to supply the object material, a detector adapted to detect the lateral sealing time of the lateral sealing unit, and a control unit for having the material supplied intermittently by controlling the material supply unit on the basis of the material supplying starting time between the time of the reception of an output signal from the lateral sealing time detector and that of starting supplying the material, and the material supplying continuation time between the time of starting supplying the material and that of stopping supplying the material.

4. A filling and packaging machine according to claim 3, wherein the machine is further provided with a material supplying condition setting unit for setting at least one of the material supplying starting time and the material supplying continuation time on the basis of the packaging conditions for each kind of material.

5. A filling and packaging machine according to claim 4, wherein the machine is further provided with a storage unit for storing the conditions set by the material supplying condition setting unit.

* * * * *